Dec. 1, 1964   L. C. LAMING   3,159,550
REMOVABLE THERMAL SHIELD
Filed Aug. 17, 1962   2 Sheets-Sheet 1

INVENTOR
LINDON C. LAMING
BY
Richard H. Thomas
ATTORNEY

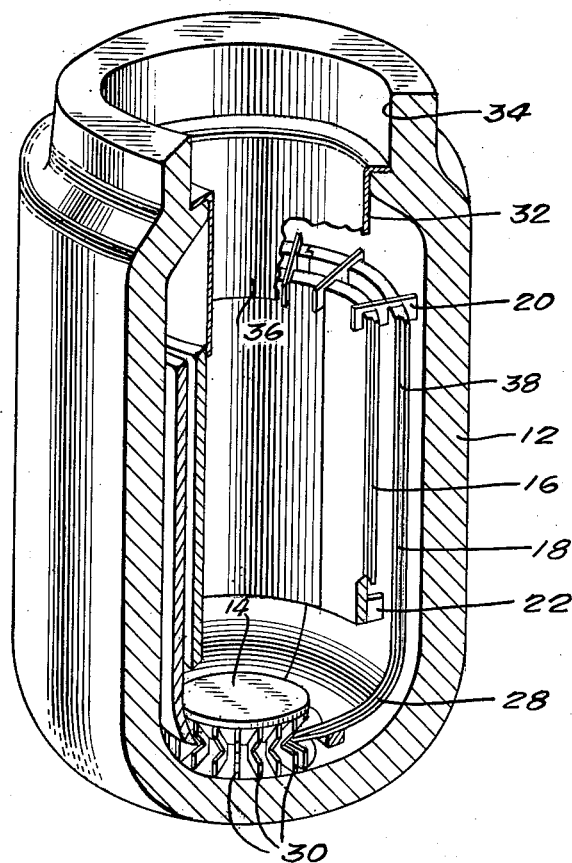

United States Patent Office 3,159,550
Patented Dec. 1, 1964

3,159,550
REMOVABLE THERMAL SHIELD
Lindon C. Laming, Redhill, Surrey, England, assignor to Foster Wheeler Corporation, New York, N.Y., a corporation of New York
Filed Aug. 17, 1962, Ser. No. 217,664
7 Claims. (Cl. 176—87)

This invention relates to nuclear reactor vessels, and in particular to a shield arrangement for nuclear vessels.

In such vessels, it is usual to protect the wall of the vessel from radiation heating and other effects of the reactor core by arranging a metal shield or shields between the core and the wall. Such shields can be permanent fixtures installed before completion of the vessel. In that case, it is impossible to inspect the inside of the vessel during service or to replace the shields except by cutting them up. To overcome that difficulty, the external wall of the vessel may be provided with a removable closure through which the shields can be withdrawn complete. This, however, involves a substantial amount of costly structural work which it is of interest to avoid.

In accordance with the invention, shields are used which are segmented so that the segments can be inserted and withdrawn through the opening required for installation and removal of the reactor core assembly, and which further are adapted to be locked together within the vessel.

In a preferred form of the invention, the segments and locking devices therefor are such that insertion, unlocking and removal of the segments can be effected without personnel having to enter the vessel, and without the making and unmaking of welded, riveted, bolted or like connections.

An example of the construction and use of shields in accordance with the invention will now be described with reference to the accompanying drawings, in which:

FIGURE 3 is a perspective view of a vessel and an outer shield segment therefor showing means for locating the latter at its lower end.

Figure 1:
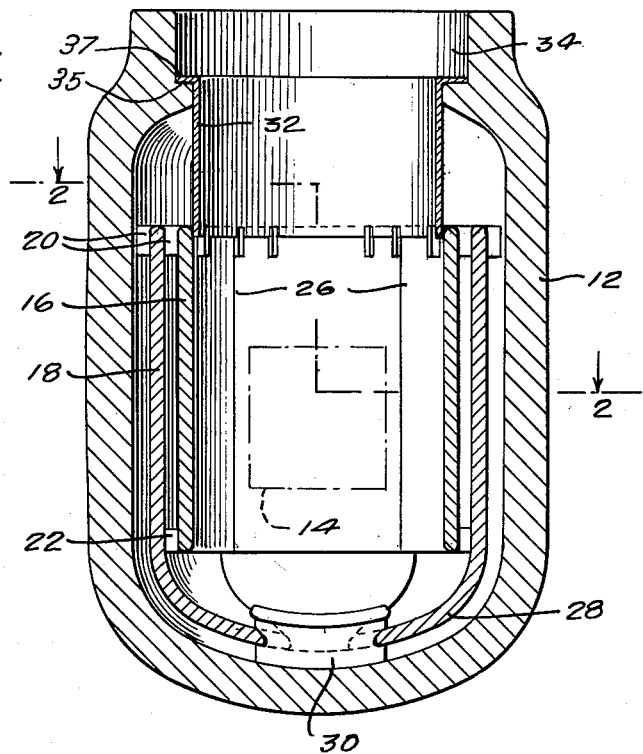
FIGURE 1 is a diagrammatic sectional elevation view of a reactor vessel provided with two shields.
Figure 2:
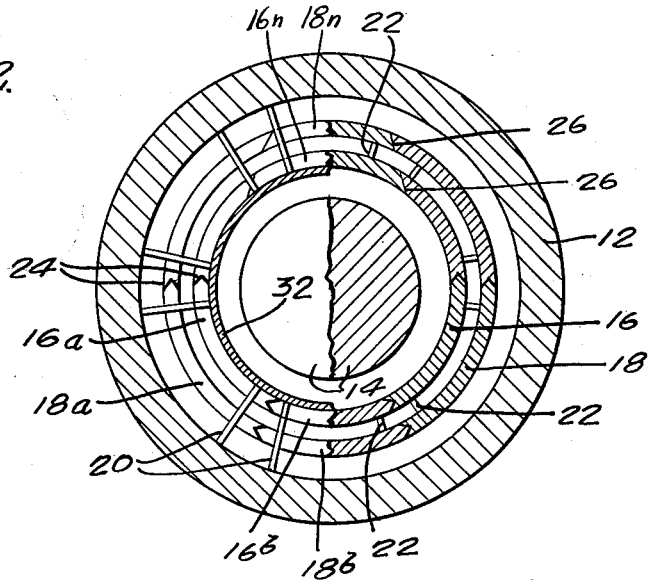
FIGURE 2 is a section view taken along line 2—2 of FIG. 1.

The vessel 12 shown in the drawings is a typical reactor vessel containing a core 14. For protection of the wall of the vessel there are provided two coaxial metal rings 16 and 18 made up of individual segments, such as 16a, 16b, 18a, and 18b (FIG. 2). Each of the segments in the ring 16 is fixed to the corresponding segment in the ring 18 by radial webs 20 and 22 to which they are welded.

It is essential to minimize radiation from the core through the joints between neighboring segments. For this purpose, the segments are provided with interfitting chevron joints 24 which avoid the existence of rectilinear radiation leakage paths. However, such joints cannot be provided between all the segments as that would preclude assembly of the segments. One of the pairs of segments, for instance, the pair 16n and 18n, is therefore provided with scarf joints 26 which, although not being radial, provide an acceptable resistance to radiation leakage.

The assembly of segments is held in position at the bottom end of the vessel 12 by the engagement of curved lower ends 28 of the outer segments 18 in notched plates 30 arranged radially side-by-side as shown in FIG. 3. The assembly further is held in position at the upper end of the vessel by a sleeve 32, which is suspended in the neck 34 (by a peripheral outwardly extending flange 35 engaging annular seat 37 within the neck 34 of the vessel) of the vessel, and the lower end 36 of which is notched to fit over the webs 20 by which the two rings of segments are joined.

The composite shield can be assembled and dismantled without difficulty. To dismantle it, the sleeve 32 is first withdrawn. Thereupon the segments 16n and 18n are withdrawn as a unit after which the remaining units are withdrawn one-by-one. For assembly, the units are placed in position one-by-one with the lower ends engaged in the notched plates 30 and their upper ends held located by the abutment of the webs 20 against the wall of the vessel. Then the sleeve 32 is put in position.

Although a two-ring shield has been described, the shield can be made up of any desired number of rings.

An alternative form 38 of a joint between the segments, having an L configuration, is shown in FIG. 3. Many modifications will be apparent to those skilled in the art and within the scope and spirit of the invention as defined in the following claims.

What is claimed is:

1. In a reactor vessel having an access opening in the upper end thereof, a vertically oriented annular shield ring arranged in said vessel approximately coaxial with said access opening but spaced from the vessel wall, shield support means at the bottom of said vessel, said shield ring comprising a plurality of adjacent elongated segments having parallel longitudinal edge connections so that adjoining edges of the segments mesh to provide a continuous annular barrier against rectilinear radiation paths, at least two of said connections having scarf joints such that at least one of said segments may be withdrawn lengthwise through said access opening, said shield segments further having lower end portions which converge inwardly towards each other, said support means being adapted to engage said shield lower end portions, said shield ring further including spacing means to space said segments from the vessel wall, and sleeve means adapted to be withdrawn through said access opening and further cooperating with said spacing means to engage the upper end portions of said shield ring segments.

2. In a reactor vessel having an access opening in the upper end thereof, a vertically oriented annular shield ring arranged in said vessel approximately coaxial with said vessel opening but spaced from the vessel wall, shield support means at the bottom of said vessel, said shield ring comprising a plurality of adjacent elongated segments having parallel longitudinal edge connections so that adjoining edges of the segments intermesh to provide a continuous annular barrier against rectilinear radiation paths, two of said connections, however, forming scarf joints such that one of said segments may be withdrawn lengthwise through said access opening, said shield segments further having lower end portions which are curved inwardly towards each other, said support means comprising radially disposed slots adapted to engage said lower end portions of said segments, said shield ring further including spacing means to space said segments from the vessel wall, and sleeve means seated within and adapted to be withdrawn through said access opening and further cooperating with said spacing means to engage the upper end portions of said shield ring segments.

3. In a reactor vessel according to claim 2 and further including a second annular shield spaced from but coaxial with said first mentioned shield, means affixed to said first mentioned shield by which said second shield is supported, said second shield also comprising a plurality of adjacent elongated segments having parallel longitudinal edge connections so that adjoining edges of the segments intermesh to provide a continuous annular barrier against rectilinear radiation paths, one of said segments, however, being adapted to be withdrawn lengthwise through said access opening along with said similarly adapted segment of said first mentioned shield ring.

4. In a reactor vessel according to claim 2 wherein said vessel opening has an annular seat therein, said sleeve means comprising a cylindrical member having an upper outwardly extending flange engaging said seat, the lower end of said sleeve means being adapted to press outwardly against the upper end portions of said shield ring segments.

5. In a reactor vessel according to claim 2 wherein said connections except for said scarf joints form interfitting joints having a chevron configuration.

6. In a vertically oriented reactor vessel having an access opening in the upper end thereof, a vertically oriented cylindrical shield ring arranged in said vessel approximately coaxial with said vessel opening but spaced from the vessel wall, said shield ring being open at the top and comprising a plurality of adjacent elongated segments having parallel longitudinal edge connections so that adjoining edges of the segments intermesh to provide a continuous annular barrier against rectilinear radiation paths, said segments further having adjacent intermeshing lower end portions which converge inwardly towards the bottom of said vessel to form a dome-like configuration, means at the bottom of said vessel adapted to engage said lower end portions, at least two of said connections between adjacent segments forming scarf joints so that at least one of said segments may be withdrawn lengthwise through said access opening, said shield ring further comprising spacing means to space said segments from the vessel wall, and sleeve means seated within and adapted to be withdrawn through said access opening and further cooperating with said spacing means to engage the upper end portions of said shield ring segments.

7. In a vertically oriented reactor vessel having an access opening in the upper end thereof, an outer and at least one inner vertically oriented coaxial but spaced apart, cylindrical shield rings arranged in said vessel approximately coaxial with said vessel opening but spaced from the vessel wall, said shield rings being open at the top and each comprising a plurality of adjacent elongated segments having parallel longitudinal edge connections so that adjoining edges of the segments intermesh to provide a continuous annular barrier against rectilinear radiation paths, the outer of said segments further having adjacent intermeshing lower end portions which converge inwardly towards the bottom of said vessel to form a dome-like configuration, means at the bottom of said vessel adapted to engage said lower end portions, said shield ring further comprising spacing means to space said outer ring segments from the vessel wall and to space and support the segment of said at least one inner shield ring from and on said outer shield ring whereby radially adjacent segments of said shield rings are connected together to form integral units, at least one of said units being adapted to be withdrawn lengthwise through said vessel access opening, and sleeve means seated within and adapted to be withdrawn through said access opening and further cooperating with said spacing means to engage the upper end portions of said shield ring segments.

References Cited in the file of this patent

UNITED STATES PATENTS

| 2,932,745 | Alberti et al. | Apr. 12, 1960 |
| 3,031,394 | McCorkle et al. | Apr. 24, 1962 |
| 3,060,111 | Sherman et al. | Oct. 23, 1962 |
| 3,074,585 | Koontz | Jan. 22, 1963 |
| 3,121,046 | Trickett et al. | Feb. 11, 1964 |
| 3,124,514 | Koutz et al. | Mar. 10, 1964 |

OTHER REFERENCES

Directory of Nuclear Reactors, vol. 1, June 1959, page 35.